Jan. 15, 1924.  1,480,950
O. S. PENN
GRIP PULLEY
Filed Dec. 11, 1922    2 Sheets-Sheet 1
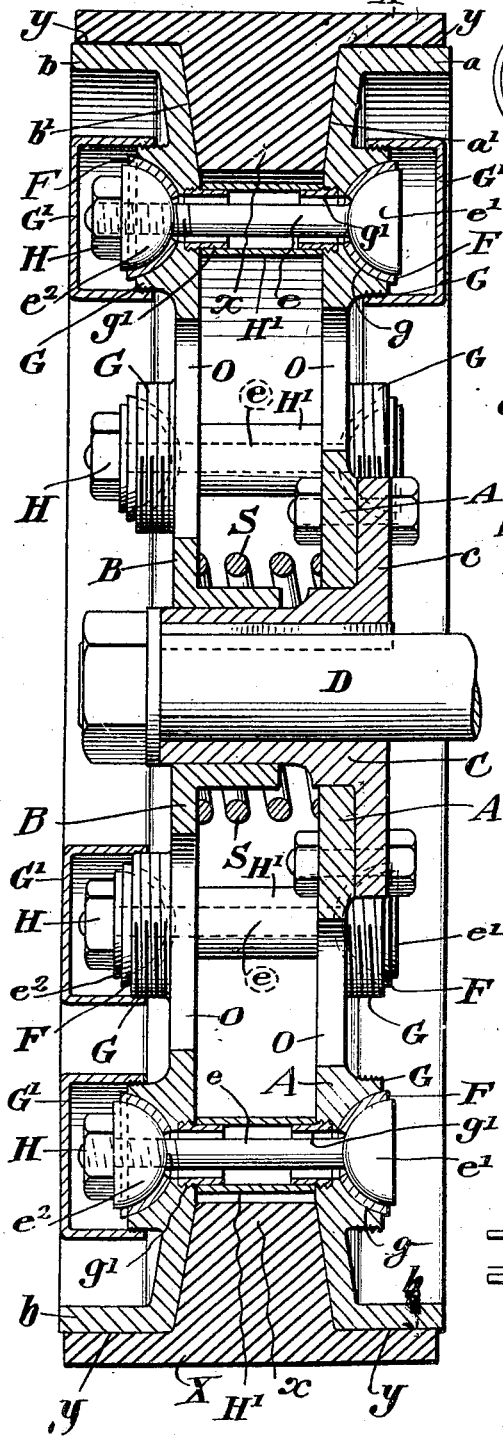
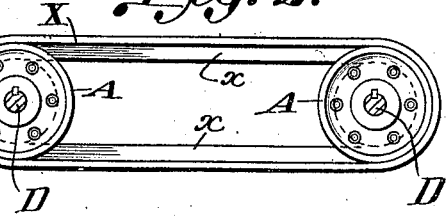
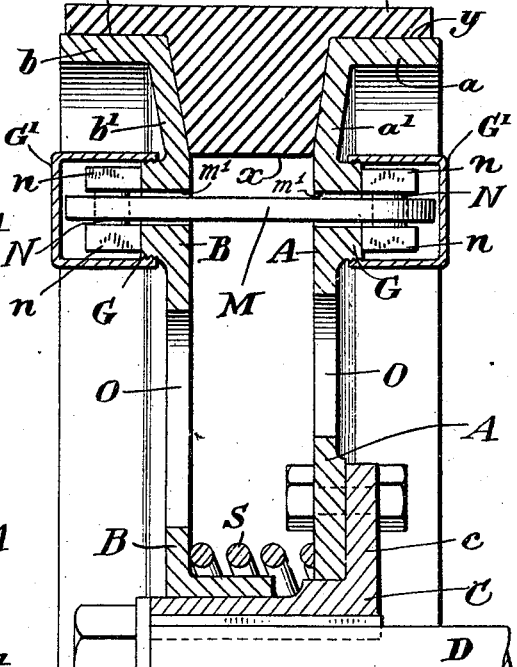
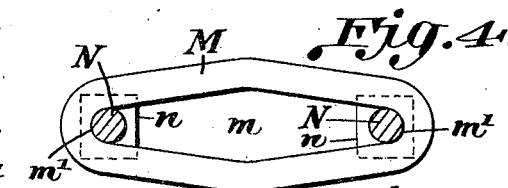
Inventor
O. S. Penn
by his Attorneys
Baldwin & Wight Jan. 15, 1924.  
O. S. PENN  
GRIP PULLEY  
Filed Dec. 11, 1922  
1,480,950  
2 Sheets-Sheet 2
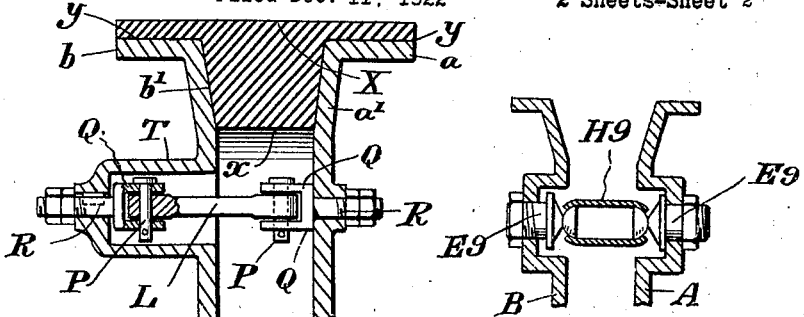
Fig. 6.  
Fig. 9.
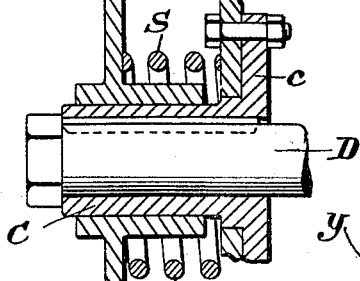
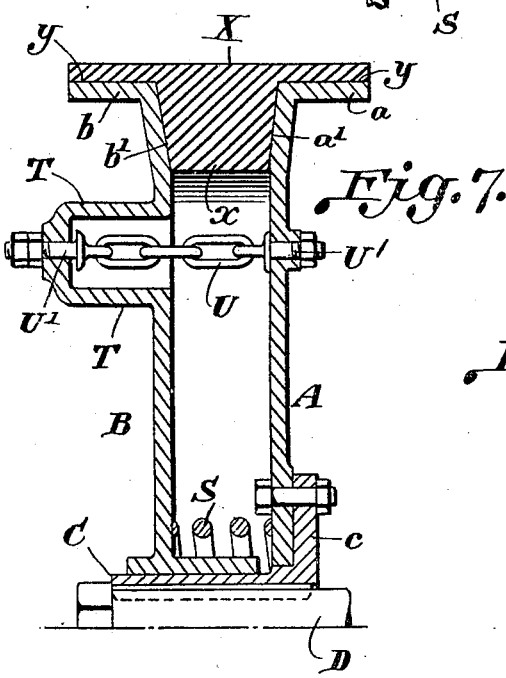
Fig. 7.
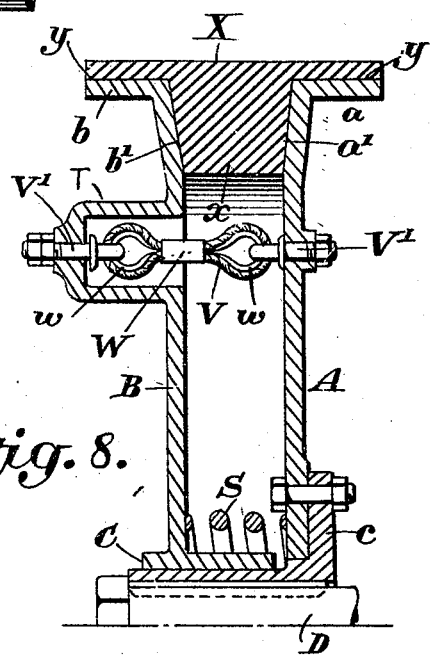
Fig. 8.
Inventor  
O. S. Penn  
by his Attorneys  
Baldwin & Wight Patented Jan. 15, 1924.

1,480,950

UNITED STATES PATENT OFFICE.

OSCAR STYLES PENN, OF LONDON, ENGLAND, ASSIGNOR TO ROADLESS TRACTION, LIMITED, OF LONDON, ENGLAND.

GRIP PULLEY.

Application filed December 11, 1922. Serial No. 606,193.

*To all whom it may concern:*

Be it known that I, OSCAR STYLES PENN, a subject of the King of Great Britain, residing at 59 West Side, Wandsworth Common, London, SW. 18, England, have invented certain new and useful Improvements in Grip Pulleys, of which the following is a specification.

This invention relates to sectional belt pulleys of the kind in which provision is made for firmly gripping the belt with which the pulley is associated when there is a tendency for the latter to slip on the former, or when the pulley tends to run ahead of the belt, and the object of the invention is to provide efficient means whereby when the belt starts to slip it will be automatically gripped and carried forward with the pulley without appreciable lost motion. The invention is adapted for use with a belt having a rib, flange, or series of teeth on its inner side.

The pulley to which my invention is applied comprises two members or sections, one of which is so connected with the pulley axle as to revolve at all times co-incidently therewith while the other member, which is also mounted on the axle or connected therewith, is adapted to have a slight turning movement about the axis of the axle and also a sidewise movement towards and from the other section or member of the pulley. A spring is interposed between two pulley members which tends to force them apart, but the members are held in proper position to engage the inner side of the belt and the rib, flange or teeth thereon by cross connections which are of such construction and which are so connected with the pulley members that when one member of the pulley starts to run ahead of the other, the cross connections will be so operated as to draw the pulley members towards each other and cause them to grip the rib, flange or teeth of the belt.

My improvements are illustrated in the accompanying drawings, in which:—

Figure 1 shows a vertical central section through a grip pulley with my improvements applied.

Figure 2 is a diagram illustrating one of the uses of the invention.

Figure 3 is a sectional view of a grip pulley showing a modified form of my invention applied thereto.

Figure 4 is a detail view of the cross connection shown in Figure 3.

Figure 5 illustrates diagrammatically the operation of the devices shown in Figure 1.

As my invention may take various forms, I have illustrated a few additional modifications in Figures 6, 7 and 8.

In Figure 1 the cross connections are in the form of bar links having their opposite ends pivotally connected with the two pulley members. In Figure 4 the cross connections are in the form of loop links.

Figure 6 is a sectional view of a grip pulley in which bar links are pivotally connected with yokes interposed between the two pulley members.

Figure 7 is a sectional view of a grip pulley in which a plurality of loop links is employed, said links being connected to the pulley members by eye bolts.

Figure 8 is a sectional view of a grip pulley in which the connections between the pulley members are made by means of links formed of wire rope. Fig. 9 shows a further modification.

The pulley embodying my improvements may be employed in various ways and for different purposes. For convenience I have herein shown it as applied to a belt or endless track such as is commonly used in tractors and similar vehicles.

The pulley shown in the several figures of the drawings has two main members or sections A and B. The member A is bolted to the flange $c$ of the hub C, which latter is keyed to the axle D. The member B is not keyed to the hub or to the axle and may turn on the axle D to a limited extent. It has a short movement endwise of the axle. Each member A and B is formed with a peripheral flange $a$, $b$ adapted to engage the inner side of the belt X on opposite sides of the rib $x$ at $y$ and the inner sides of the two pulley members are inclined at $a'$, $b'$ to correspond with the opposite sides of the rib $x$.

A spring S, which surrounds the pulley hub, is interposed between the members A and B and tends to separate them but these members are held in operative position by the cross connections shown which limit the sidewise movement of one member relatively to the other. These connecting members may be of various kinds. As shown in Figure 1 they take the form of bar-links or dumb-bell bolts, i. e., bolts having hemispherical heads at opposite ends. Each connecting member as illustrated in Figure 1 comprises a shank $e$ having a hemispherical head $e'$ at one end and at the opposite end a hemispherical nut $e^2$ adjustable on the threaded end of the shank. The head and nut are seated in steel bearing cups F mounted in hemispherical recesses $g$ formed in the bosses G of the pulley members. The nut $e^2$ of each connecting member is held in place when adjusted by a lock nut H.

These connecting members serve to hold the pulley members A and B in proper position to engage the belt in the manner illustrated in Figure 1 and when so engaged, under normal conditions, the belt and the pulley members move together co-incidentally but should the driven member A tend to run ahead of the belt or the movement of the belt be retarded, the member B which adhers to the belt lags behind the other member slightly and thus causes the cross connections to turn from the position shown in full lines in the diagram, Figure 5 to that indicated by dotted lines in the same figure. By this movement the member B will be drawn closer to the member A and thus will be caused to grip firmly the flange of the belt. In this way means is provided for automatically causing the pulley to grip the belt and move co-incidently therewith should the belt tend to slip on the pulley or to lag behind the movement thereof.

In order to keep the bearings clear of dust or other foreign matter I may apply caps G' to the bosses G to cover the pivoted ends of the links and a flexible sleeve H' may be applied to each link between the pulley members to prevent the entrance of dust from the inside of the pulley. Each of these sleeves may be supported on rings $g'$ surrounding the bolt and secured to the inner sides of the members A and B.

The same result may be accomplished by other forms of links or cross connections. For instance, instead of employing dumb-bell bolts as illustrated in Figure 1, I may employ links of the kind illustrated in Figures 3 and 4. As shown in Figure 3 the general construction of the pulley members is similar to that shown in Figure 1. In this case, however, the bosses G are not recessed and instead of employing dumb-bell bolts I employ loop links M of the kind illustrated in plan in Figure 4 and connect them with the pulley members A and B by bolts N. The links extend through openings $m'$ in the members A and B and through the bosses G and they receive the pins or bolts N having headed ends $n$. The opening $m$ in each link as shown in Figure 4, is of sufficient size to allow the headed bolts to be inserted in the link and then moved endwise therein. One of the bolts may have a removable part $n$ to facilitate in assembling the parts. When properly connected as shown in Figure 3, the links hold the pulley members A and B against the force of the spring S in operative position relatively to the belt. Should the pulley tend to run ahead of the belt or the belt tend to lag behind, the links will be moved from their straight-across connecting position to the inclined position illustrated in Figure 5 and will cause the pulley sections to firmly grip the flange of the belt. Caps G' may be employed to exclude dust if found desirable.

In Figures 6, 7 and 8 such parts as are similar to those shown in Figure 1 are similarly lettered. Referring to Figure 6, instead of employing dumb-bell bolts as illustrated in Figure 1 I may employ links L, the opposite ends of each of which are pivotally connected by pins P to yokes Q carried by bolts R secured to the pulley members A and B. In this case the member B or one of the members A and B is provided with a housing or extension T within which one of the connections between the link L and the yoke Q is made, while the connection between the opposite end of the link and the yoke is between the members A and B. The bolts R extend beyond the housing Q and the member A and carry tightening nuts. In this case dust excluding caps are not usually required but such caps may be used wherever necessary.

In Figure 7 the construction is similar to that shown in Figure 6 except that in this case a plurality of loop links U is employed and each set of links is connected with eye bolts U' secured to the pulley members.

In Figure 8 instead of employing the links or cross connections of the kind hereinbefore described I may employ links made of wire rope. Each link may consist of a looped wire cable having looped ends connected with eye bolts V'. Loops may be thus formed in the links V by having the adjacent middle portions of each link welded together and if preferred held securely by a surrounding sleeve W. Bearing grommets $w$ may be employed if desired. In Fig. 9 two semi-dumb-bell bolts $E^9$ are connected by a sleeve $H^9$ having spun ends flexibly connected with the bolts.

While I have illustrated the preferred forms of my invention the same results may be otherwise accomplished.

The pulley members are preferably of the form shown having openings O to reduce weight and to permit the exit of foreign matter, and while the member B is mounted to revolve upon the hub of the pulley it may be otherwise mounted and supported.

It will be observed that the cross connections between the pulley members are arranged near the periphery of the pulley close to the belt so that when the connections are bent or flexed those portions of the pulley members which grip the rib of the belt are held and braced by connections arranged close to the part gripped and thus greater security is afforded. While the connecting devices shown in Figure 1 are in the form of bolts they are in fact links although not loop links of the kind shown in Figure 3 and other figures of the drawings and therefore the pulley members shown in Figure 1 may properly be said to be link-connected.

In all forms of the invention shown, the pulley members are "link connected", i. e. connected by some form of links which are in various ways bent or flexed to accomplish the purposes for which they are used.

I claim as my invention:

1. A grip pulley adapted to be associated with a belt having a part to be gripped, and comprising a plurality of members having belt gripping parts at least one of which is mounted to revolve at all times with a centrally arranged axle, and another member mounted to turn about a fixed axis independently of the axle, and link connections between the two members.

2. A grip pulley adapted to be associated with a belt having a part to be gripped, and comprising a plurality of members having belt gripping parts at least one of which is mounted to revolve at all times with a centrally arranged axle, and another mounted to turn about a fixed axis independently of the axle, and link connections between the pulley members near the periphery of the pulley.

3. A grip pulley adapted to be associated with a belt having a part to be gripped, and comprising a plurality of members having belt gripping parts at least one of which is mounted to revolve at all times with a centrally arranged axle, and another mounted to turn about a fixed axis independently of the axle, and flexible link connections bebetween the two members.

4. A grip pulley adapted to be associated with a belt having a part to be gripped, and comprising a plurality of members having belt gripping parts at least one of which is mounted to revolve at all times with a centrally arranged axle, and another mounted to turn about a fixed axis independently of the axle, and links flexibly connecting the two members near the periphery of the pulley.

5. A grip pulley adapted to be associated with a belt having a part to be gripped comprising a member having a belt gripping part and adapted to rotate at all times with an axle, an associated member having a belt gripping part adapted to turn independently of the axle about the axis thereof, and cross-connecting members extending from one pulley member to the other and which are pivotally connected therewith.

6. A grip pulley adapted to be associated with a belt having a part to be gripped comprising a member having a belt gripping part adapted to rotate with an axle, an associated member having a belt gripping part having a rotary movement independently of the axle, and cross connecting members extending from one pulley member to the other and pivotally connected at their opposite ends to the pulley members.

7. A grip pulley comprising a member adapted to rotate at all times with an axle, an associated member adapted to turn independently of the axle about the axis thereof, cross connecting members extending from one pulley member to the other and which are pivotally connected therewith in combination with a belt having a rib, flange or teeth on its inner side with which the pulley members engage.

8. A grip pulley adapted to be associated with a belt having a part to be gripped comprising two members having belt gripping parts, an axle on which they are mounted, and connecting members parallel with the axle, the opposite ends of which are pivotally connected with the pulley members.

9. A grip pulley comprising two pulley members, a spring tending to separate said members, and connecting members for holding the pulley members in normal operative position and which are pivotally connected with the pulley members at opposite ends whereby when one pulley member tends to run ahead of the other, the connecting members will be so moved as to cause the pulley members to grip the belt.

10. The combination with a belt having a flange on its inner side, of a grip pulley comprising pulley members adapted to engage the belt on opposite sides of the flange and one of which is connected to turn coincidently with a supporting shaft or axle and the other of which is adapted to move endwise on the axle towards and from the first mentioned pulley member, a spring tending to separate the two members, and connecting devices for the pulley members which hold said pulley members in normal operative position in engagement with the belt but which are movable from their normal position cross-wise of the pulley to draw the pulley sections into firm engagement with the belt.

11. A grip pulley adapted to be associated with a belt, and comprising a plurality of members at least one of which is mounted to revolve at all times with a centrally arranged axle and another mounted to turn about a fixed axis independently of the axle, link connections between the two members and a spring interposed between the pulley members tending to separate them and to thus straighten the link connections.

12. A grip pulley comprising a member adapted to rotate at all times with an axle, an associated member adapted to turn independently of the axle about the axis thereof, links extending from one pulley member to the other, and pivotally connected therewith, and dust excluding caps applied to the pulley members for protecting said pivotal connections.

13. A grip pulley comprising a member adapted to rotate at all times with an axle, an associated member adapted to turn independently of the axle about the axis thereof, links extending from one pulley member to the other and which are pivotally connected therewith, and means interposed between the pulley members for excluding dust from the pivotal connections of the links with said pulley members.

London this 22nd November, 1922.

OSCAR STYLES PENN.